May 2, 1961 G. W. SCHATZ ET AL 2,982,122
STEP FUNCTION ACCELERATION MACHINE
Filed May 29, 1957
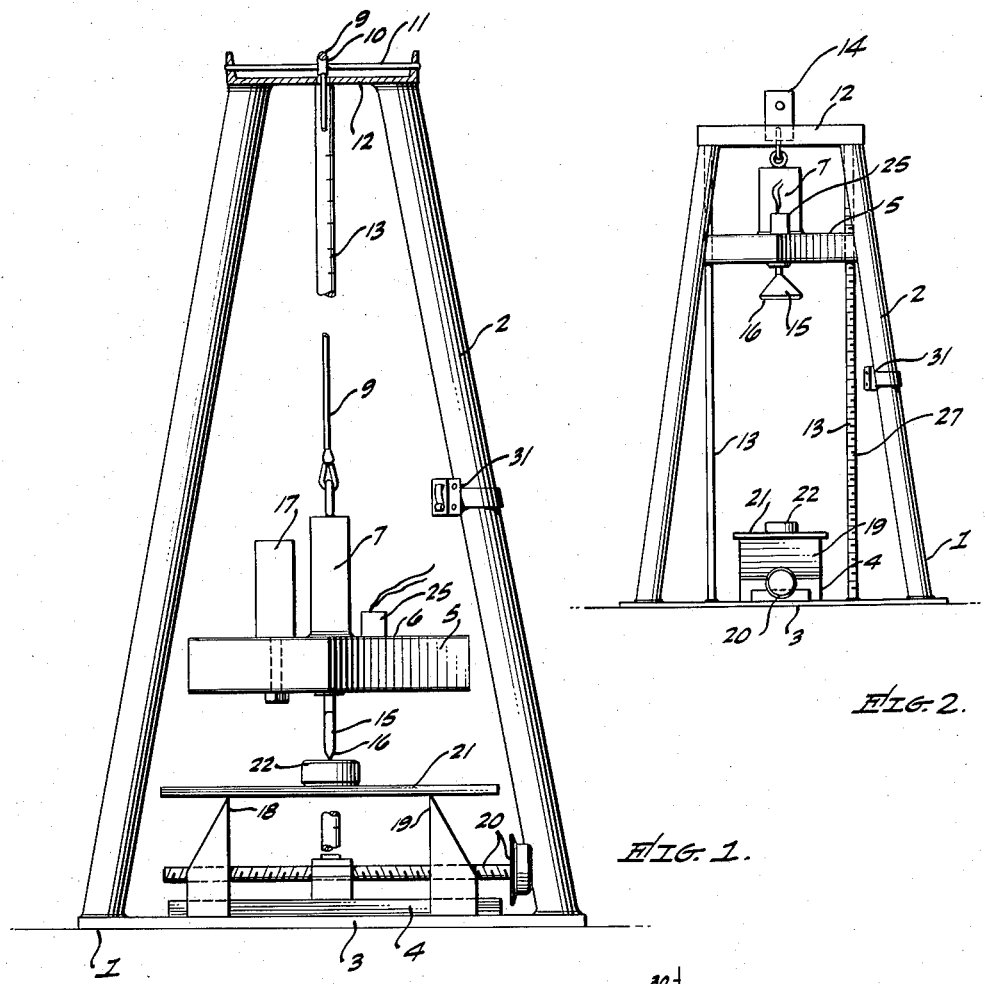
FIG. 1.
FIG. 2.
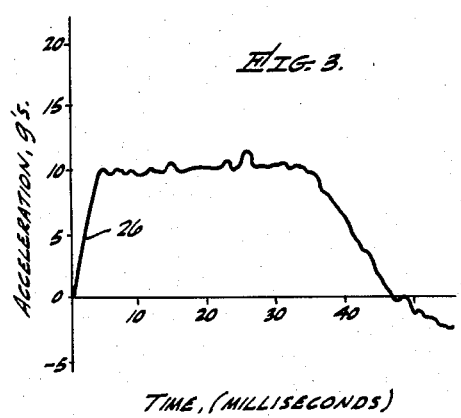
FIG. 3.
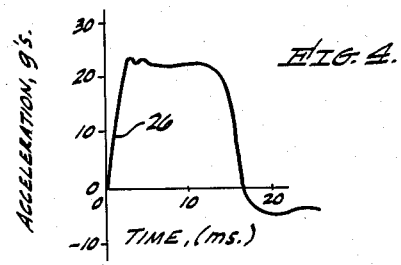
FIG. 4.
INVENTORS.
GEORGE W. SCHATZ,
JOSEPH ELY COHEN,
BY
ATTORNEY

United States Patent Office 2,982,122
Patented May 2, 1961

---

2,982,122

STEP FUNCTION ACCELERATION MACHINE

George W. Schatz, Playa Del Rey, and Joseph Ely Cohen, Van Nuys, Calif., assignors to Hughes Aircraft Company, Culver City, Calif., a corporation of Delaware Filed May 29, 1957, Ser. No. 662,373

3 Claims. (Cl. 73—12)

This invention relates to testing devices and particularly to means for determining the effect on equipment of the application of a prolonged square wave impulse or step function.

The requirements placed on control devices in aircraft, guided missiles and the like, which are to be subjected to high accelerations, make it necessary to test the equipment prior to its use in a far more rigorous manner than is necessary with devices subject to smaller accelerations extending over a short period of time.

Shock testing machines are well known for testing the loading functions and static load capacities of those devices to be used in services not subjected to extreme accelerations. The dynamic responses of the known devices are, however, quite random and erratic, and the present invention has been made to meet this particular need.

The present invention is designed to subject test specimens to a constant value of acceleration of any desired magnitude within a normal range of 2 to 10 g. This range has been extended as far as 30 g. The instantaneous value of acceleration should be displayed visually or recorded, as on film, and the amplitude of the acceleration must be held within ± of a desired value for efficient operation. The duration of the pulse should be controllable over an extended range. In a particular application, it was extended to 30 milliseconds, for example. The rise time of the pulse, that is, the time for the leading wave front to go from 0 to the desired amplitude, should be controllable, and for the particular types of equipment to be tested here, was held to not more than 3.0 milliseconds. All of these requirement were here met for the test specimens of not over 3 pounds in weight and with an overall flat frequency response of the instrumentation from 0 to 500 cycles per second, but the same principles are readily applicable to the precision testing of much larger specimens.

In an effort to meet these requirements, machines utilizing hydraulic control to arrest the motion of a freely falling test specimen, have been quite satisfactory for many purposes. However, low impact machines of the hydraulic type have not been available and their complexity and expense have precluded their development and construction for laboratory usage.

The known shock testing machines are of two general types. One, those in which the test specimen is secured to a mounting fixture and the fixture is subjected to a prescribed motion in order to produce the desired acceleration; second, a type which uses a supporting table set in motion by free fall or by a gradual application of force and then brought rapidly to rest by allowing it to strike a fluid, solid or semi-solid material.

The machines of the first type give an output predominantly composed of random vibrations. Those of the second type are generally unsuitable for the production of a constant acceleration. The present invention falls within the latter group, since it is desired to subject the test specimens to this type of shock over a prolonged period. In the past, elastic means for arresting the elevator or other moving means for supporting the structure to be tested, have been used but are unsatisfactory since the acceleration would be proportional to the displacement during impact, rather than the constant fall desired. Similarly, the use of granular absorbing materials, such as sand, is unsatisfactory. Although far superior to elastic materials, such granular absorbing means nevertheless produce a retarding force largely dependent upon the displacement. This effect is probably due to impaction of the granular material. The use of brake bands or other friction device is unsatisfactory because of the design complexity and expense.

The present invention offers a solution to the problem by utilizing a free falling specimen with a decelerating medium which deforms non-elastically under impact, in combination with an initially-engaged plastic member. For this purpose, a lead beam, combined with a plastic pellet, is utilized. It has been found that by permitting such a beam to be deformed through a relatively large deflection, an unusually long duration could be obtained, with a shock pulse amplitude substantially constant after the initial contact. It has been found that by combining the non-elastic beam with a plastic intermediary member, the high frequency vibration produced hitherto by the initial contact, continuing usually for about 3 milliseconds, may be eliminated. It has been found that this combination will control the rise time of the pulse in such a way that the resonant modes of the supporting mechanism are not significantly disturbed. By this means, step function waves have been obtained approximating very closely a square wave, enabling far more accurate tests to be applied to the subject equipment.

It is thus the primary object of the invention to provide simple and low cost testing means for subjecting equipment to be tested to a step wave or square wave type of acceleration.

It is a further object to subject the equipment to be tested to an impulse of the square wave type over a controllable period of time significantly greater than that formerly obtainable.

Yet another object is to obtain these results without introducing an erratic high-frequency vibration at the beginning of the shock impulse.

These and other objects will be apparent from the detailed description following in connection with the drawings in which:

Fig. 1 is a schematic perspective view of the testing device with a specimen in position to be tested;

Fig. 2 is a view similar to that of Fig. 1, but with the specimen removed and the machine positioned to show further details of the construction;

Fig. 3 is a graph showing a step acceleration impulse which may be applied by the use of this device;

Fig. 4 is another curve showing a square wave acceleration impulse produced by the device of this invention.

Referring now to the figures, a testing machine in accordance with the invention is shown. This device has made it possible to meet the requirements for devices such as inertia switches employed in aircraft to disable a portion of the control mechanism in case accelerations in excess of a certain value are obtained. Such switches must be operable when an acceleration variable over a range substantially from 0 to 10 times gravity is applied to the switch over a substantial period of time, which may be of the order of 0.03 second. In the testing device as shown, amplitudes up to 30 g have been produced with a duration exceeding 0.10 second.

In the testing device, the equipment to be tested is secured to a table or mounting fixture which is allowed to fall freely and then brought to a stop within a given period to produce the desired acceleration. It will be recognized that this imparts a negative acceleration to the device. The magnitude of the negative acceleration is controlled through the means for bringing the mounting fixture to rest, and the effect on the specimen is the same as if it had been accelerated positively. The specimen is brought abrupty to rest by allowing it to strike an inelastic but deformable material, used in conjunction with a plastic pellet. The inelastic material has the form of a lead beam supported on spaced knife edges. The rise time is controlled so that structural resonances of the machine are not disturbed by means of a dough-consistency plastic pellet placed between the beam and the table. In addition, the pellet supplies sufficient damping to dissipate any elastic waves in the beam before plastic deformation begins. It has been found that by this means, a testing impulse having a square wave or step function form, the major portion of which closely approximates a straight line, can be applied at a desired level of acceleration. The shock is uniformly reproducible, is independent of the test specimen, and at the same time, the equipment is simple and relatively inexpensive.

The testing device indicated generally as 1 in Figs. 1 and 2, consists of a conventional supporting stand 2, upon the base 3 of which beam-supporting means 4 are disposed. A specimen-supporting table 5 is disposed movably within the stand 2.

The specimen-supporting table 5 comprises a heavy rigid table portion 6, upon which the test specimen is to be mounted as by clamps, screws, bolts or other conventional means. A supporting shank 7 extends upwardly from table 6 and is connected to a suspending cable 9. Cable 9 passes vertically upward and over a pulley 10, mounted on an axle 11. The pulley 10 and axle 11 permit a change in the direction of tension in the cable. Cable 9 is connected to suitable means not shown in the figure, but conventional in character, such as a motor and clutch arrangement, for raising the specimen-supporting table 5 and permitting it to drop freely from the top 12 of the support 2 along guides 13. Alternatively, the cable 9 might be eliminated, and a magnetic release clutch substituted therefor. In such case, the table 5 might be raised by hand to engage clutch means shown schematically at 14. The elevator 5 carries a tup 15 or equivalent means for engaging the decelerating means. Tup 15 may be of conventional design with its bottom formed as a half-round striking surface 16. A test specimen shown schematically at 17, is secured to table 6 of elevator 5 by means such as bolts, passing therefrom and engaging a suitably thread portion of the test specimen. Alternatively, C-clamps or equivalent means, not shown, might be used to secure the test specimen in position on the table 6.

The supporting means 4 are here illustrated as comprising a pair of knife edges 18 and 19, adjustably positionable by means of a calibrated screw and knob assembly 20, mounted in base 4. A lead beam 21 which may be, for example, ¼" thick and 4" wide, is placed on the knife edges 18 and 19, and the adjusting screw and knob 20 utilized to provide accurately spaced supporting means. On the upper side of the lead beam 21 is placed a plastic pellet 22, formed of a small amount of a dough-consistency plastic. This plastic may be a sealing material, such as that marketed by the Presstite Engineering Co., as their No. 578.3 Sealer, which is a fibrous, slightly tacky, heavy dough-like mastic, having 98% of modified non-drying resin with 2% of inert mineral fillers. It has been found that when this plastic pellet 22 is used in conjunction with the lead beam 21, the initial rise time to the desired level of deceleration can be so controlled as to prevent the high frequency vibrations which have hitherto resulted immediately after impact.

The lead beam 21 deforms inelastically, that is, there is substantially a complete absence of restoring force tending to return the beam to its original conformation after an initial deforming force has been applied thereto, sufficient to produce an actual deformation. The deceleration applied to the specimen after the table 5 has been dropped a specified distance, as indicated on the scale 23, may be controlled by varying the distance between the supporting knife edges 18 and 19, and thus permitting a greater or lesser vertical deformation of the beam 21. The negative acceleration imparted to the test specimen 17 when the tup 15 strikes the plastic pellet 22 and begins to deform the beam 21, might be recorded on tape permanently. It might alternatively be made visible by the use of a cathode ray tube display device, such as the Memoscope, on which the entire action may be fixed for visual inspection and study. Electrical indications proportional to the acceleration or deceleration at any instant may be obtained by the use of an accelerometer and recording means. The accelerometer generally indicated as 25, is suitably connected to indicating and recording means, which form no part of the present invention and are not illustrated in the present drawing.

The decelerations imparted to equipment to be studied have been shown in Figs. 3 and 4 for two different specimens. In Fig. 3, a step wave function has been illustrated in which the acceleration is maintained substantially constant at about 10 g's over a period in excess of 30 milliseconds, after which it reduces rapidly to zero. In Fig. 4, there has been illustrated a square wave type of acceleration which was applied over a period of substantially 15 milliseconds. It will be observed that the rise time as shown at 26 in Figs. 3 and 4, is well under 3 milliseconds. This rise time is the result of the use of the plastic pellet 22, in combination with the lead beam 21. In the particular specimens, tests of which are illustrated in Figs. 3 and 4, a drop height of 15" was employed, as measured on the scale 23, and the distance between the knife edge beam supports 18 and 19 was 10".

A microswitch 31 is utilized to initiate operation of the recording equipment at the moment the test specimen is dropped, so that a complete record will be obtained of the accelerations imparted to the device during the test.

What is claimed is:

1. In a drop testing device for imparting a square wave shock impulse to an article being tested, the combination of: a vertical frame structure; a base forming a portion of said frame structure; a table disposed for vertical movement in said frame structure; a pair of vertical parallel guides carried by said frame structure and adapted for slidable engagement by said table; a pair of spaced supports carried by and disposed within confines of said base of said frame structure; a laterally elongated sharp edged tup secured to and disposed downwardly from a lower surface of said table, said tup being normally disposed vertically above and on an axis positioned laterally between said spaced supports; and means carried by said frame structure for raising said table to a predetermined height within said frame structure, said article being adapted for disposition on said table, upwardly directed edges of said spaced supports being adapted for support of an elongated permanently deformable bar, said table and said article carried thereby being adapted for gravitational free fall from said predetermined height until engagement of said tup with said bar whereby to deform said bar and to decelerate said table at a predetermined rate.

2. In a drop testing device for imparting a square wave shock impulse to an article being tested, the combination of: a vertical frame structure; a base forming a portion of said frame structure; a table disposed for vertical movement in said frame structure; a pair of vertical parallel guides carried by said frame structure and adapted for slidable engagement by said table; a pair of vertically disposed spaced knife edge supports carried by and disposed within confines of said base of said frame structure; a laterally elongated sharp edged tup secured to and disposed downwardly from a central area of a lower surface of said table, said tup being normally disposed vertically above and on an axis positioned laterally between said spaced supports; and means carried by said frame structure for raising said table to a predetermined height within said frame structure, said article being adapted for disposition on said table, knife edges of said spaced supports being adapted for support of an elongated permanently deformable bar, said table and said article carried thereby being adapted for gravitational free fall from said predetermined height until engagement of said tup with said bar whereby to deform said bar and to decelerate said table at a predetermined rate.

3. In a drop testing device for imparting a square wave shock impulse to an article being tested, the combination of: a vertical frame structure; a base forming a portion of said frame structure; a table disposed for vertical movement in said frame structure; a pair of vertical parallel guides carried by said frame structure and adapted for slidable engagement by side portions of said table; a pair of vertically disposed spaced knife edge supports carried by and disposed within confines of said base of said frame structure; means for laterally adjusting the spacing of said supports; a laterally elongated sharp edged tup secured to and disposed downwardly from a central area of a lower surface of said table, said tup being normally disposed vertically above and on an axis positioned laterally between said spaced supports; and means carried by said frame structure for raising said table to a predetermined height within said frame structure, said article being adapted for disposition on said table, knife edges of said spaced supports being adapted for support of an elongated permanently deformable bar and a deformable plastic mass thereon, said table and said article carried thereby being adapted for gravitational free fall from said predetermined height until engagement of said tup with said bar whereby to deform said bar and said mass and to decelerate said table and said article at a predetermined rate.

References Cited in the file of this patent
UNITED STATES PATENTS

| | | |
|---|---|---|
| 2,578,903 | Smith | Dec. 18, 1951 |
| 2,630,704 | Armstrong | Mar. 10, 1953 |
| 2,656,711 | Tschuli | Oct. 27, 1953 |
| 2,740,286 | De Vost | Apr. 3, 1956 |

OTHER REFERENCES

The Hyge Shock Tester, a precision instrument for controlled shock simulation. Bulletin 4-70, February 1957. A publication of the Consolidated Electrodynamics Corp., Rochester Division (12 pages, pages 3 to 9 pertinent).